United States Patent [19]

Taylor

[11] Patent Number: 4,896,689

[45] Date of Patent: * Jan. 30, 1990

[54] CYLINDER PRESSURE RELIEF VALVE

[76] Inventor: Julian S. Taylor, 8502-A SW. 8, Oklahoma City, Okla. 73128

[ * ] Notice: The portion of the term of this patent subsequent to Feb. 16, 2005 has been disclaimed.

[21] Appl. No.: 270,315

[22] Filed: Nov. 14, 1988

Related U.S. Application Data

[63] Continuation-in-part of Ser. No. 131,592, Dec. 11, 1987, Pat. No. 4,787,409, and a continuation-in-part of Ser. No. 246,831, Sep. 20, 1988, Pat. No. 4,896,690.

[51] Int. Cl.⁴ ............................................. F16K 17/14
[52] U.S. Cl. ..................................... 137/70; 137/472; 220/366; 251/64
[58] Field of Search .................. 137/67, 70, 522, 472, 137/538, 516.11; 220/366; 251/121, 127, 118, 216, 64

[56] References Cited

U.S. PATENT DOCUMENTS

| | | | |
|---|---|---|---|
| 306,686 | 10/1884 | Hills | 137/472 |
| 391,472 | 10/1888 | Hughes | 137/472 |
| 2,092,819 | 9/1937 | Tennant | 137/70 |
| 2,268,359 | 12/1941 | Tustin et al. | 137/468 |
| 3,068,894 | 12/1962 | Bunting et al. | 137/538 X |
| 4,724,857 | 2/1988 | Taylor | 137/67 |

Primary Examiner—Stephen M. Hepperle
Attorney, Agent, or Firm—Robert K. Rhea

[57] ABSTRACT

In a pressure relief valve, a valve body is provided with an axial bore counterbored from each of its ends to form an inlet port for connection with a container of gas to be monitored and for receiving a valve assembly at its other end opening the valve axial bore in response to the valve being unseated by a predetermined pressure in the container. The valve assembly includes a piston-type valve normally seated in the bore by a collapsible strut or pin interposed between the valve and a plug member secured to the downstream end portion of the valve bore.

10 Claims, 1 Drawing Sheet

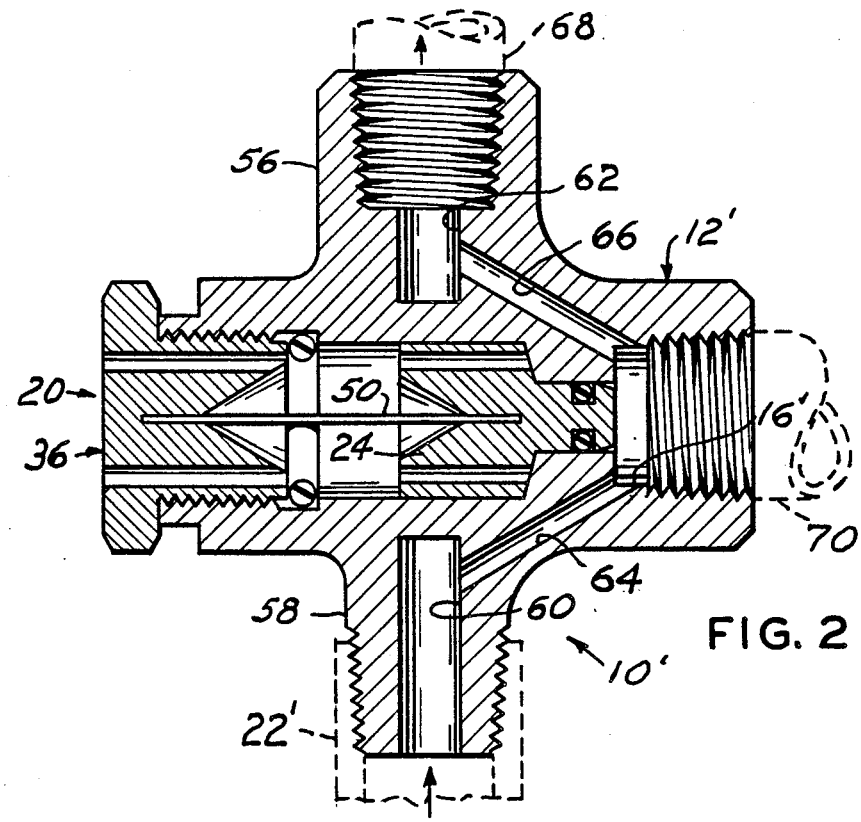
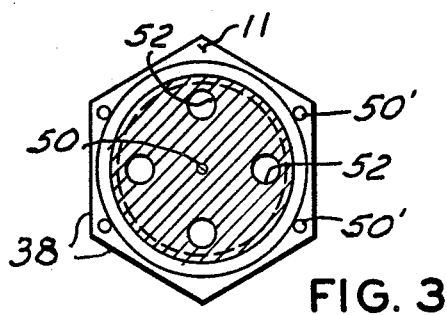
FIG. 3
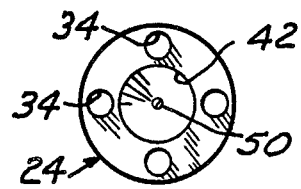
FIG. 4
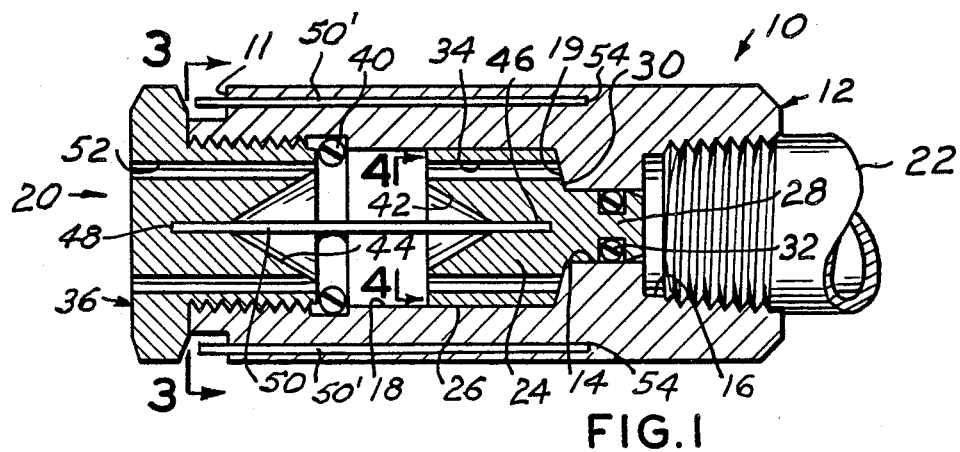
FIG. 1

CYLINDER PRESSURE RELIEF VALVE

CROSS REFERENCE TO RELATED APPLICATION

This application is a continuation-in-part of applications filed by me in the U.S. Patent and Trademark Office on Dec. 11, 1987, Ser. No. 07/131,592 now U.S. Pat. No. 4,787,409 for RUPTURE PIN VALVE SYSTEM, and U.S. Ser. No. 07/246,831, on September 20, 1988 now Pat. No. 4,896,690 for PRESSURE AND THERMAL RELIEF VALVE.

BACKGROUND OF THE INVENTION

1. Field of the invention

The present invention relates to fluid pressure relief valves.

Relief valves are conventionally used in fluid pressure systems for the purpose of protecting the fluid pressure generating equipment, such as a cylinder, cylinder heads, bolts, pump valves, packing or cups, so that, in the event of malfunction or closing an external valve in error or excessive pressure as caused by a clogged drilling bit, the relief valve is biased to an open fluid discharge position enabling the operators to correct the malfunction without damage to the equipment.

There is an important need in industry to protect sample cylinders and bottles of gas. This invention provides a pressure relief valve for such equipment.

2. Description of the Prior Art

Fluid pressure relief valves presently in use and as disclosed by prior patents generally relate to valve structure which includes a valve stem or mandrel moved longitudinally in response to predetermined fluid pressure which shears a pin or ruptures a frangible disk, or the like. The pressure setting in which these valves open to release such pressure is predetermined by the pressure necessary to shear the shear pin or rupture the frangible disk. The pressure at which such a valve opens is thus predetermined by the known rating or shearing force required to shear a pin or rupture a frangible disk of predetermined thickness.

Shear type valves are dangerous in that they can be rendered inoperative by a workman, tired of resetting the valve, putting more than one shear pin or nail through the shear bar on one type safety relief valve or using extra strong metal, such as an Allen wrench through the shear stem in another type shear relief valve. Rupture disks have the disadvantage of being difficult to service in the field after rupture.

At present, the pressure relief valve used for the above mentioned cylinders or bottles is a rupture disk. The rupture disk relief valve has several disadvantages. First, it is extremely inaccurate, having accuracies on the order of ±20%. Also, the disk is difficult to seal in the disk housing so that there is the constant danger of leakage around the edge of the disk itself. Secondly, the disk has the tendency to fail early after constant use due to fatigue. This results in a loss of fluid in spite of the fact that the "set" or predetermined rupture pressure value had not been reached.

This invention provides a relief valve in which an axial pin or strut maintains the relief valve closed and is released by excessive pressure allowing axial movement of a piston-type valve and an opening of the relief valve.

SUMMARY OF THE INVENTION

In one embodiment, a valve body is provided with a through bore counterbored at its respective ends for defining an inlet port, at one end, and a valve seat facing the other end of its bore. A valve in the counterbore opposite the inlet port closes the body bore and seats on the valve seat. A plug is secured to the counterbore end portion opposite the inlet port. An elongated strut or pin, relatively small when compared with the diameter of the counterbore and predetermined pressure resistance, is axially interposed between the valve and the plug for normally maintaining the inlet port closed. The valve and plug are each provided with at least one pressure relief passageway for exhausting fluid pressure in response to such pressure unseating the valve.

In another embodiment, the valve body is provided with oppositely disposed lateral ports and the valve body is provided with internal passageways providing communication between the lateral ports through the inlet port.

The principal object is to provide an economical relief valve for a cylinder or a bottle of gas having a greater accuracy than conventional rupture disk type relief valves presently in use for releasing fluid pressure when the pressure exceeds a predetermined value.

BRIEF DESCRIPTION OF THE DRAWINGS

FIG. 1 is a longitudinal cross sectional view of one embodiment of the relief valve;

FIG. 2 is an alternative embodiment of the valve body; and,

FIG. 3 is a vertical cross sectional view taken substantially along the line 3—3 of FIG. 1, and;

FIG. 4 is an end elevational view of the piston-type valve looking in the direction of the arrows 4—4 of FIG. 1.

DESCRIPTION OF THE PREFERRED EMBODIMENTS

Like characters of reference designate like parts in those figures of the drawings in which they occur.

In the drawings:

Referring first to FIGS. 1, 3 and 4, the reference numeral 10 indicates a preferred embodiment of the cylinder gas pressure relief valve comprising a generally cylindrical valve body 12 having a diametrically reduced end portion forming an annular shoulder 11 and having a through bore 14 counterbored from its ends to form an inlet port 16 at one end and a counterbore 18 and valve shoulder 19 in its opposite end portion which contains a pressure relief means 20, as hereinafter described.

The inlet port 16 is normally connected with a tube member 22 in communication with gas in a cylinder or bottle to be monitored, not shown. The pressure relief valve assembly 20 comprises a piston-type valve 24 having a perimeter 26 permitting longitudinal sliding movement in the counterbore 18 and having an upstream diametrically reduced forward end portion or neck 28 slidable into and out of the valve body bore 14 and defining a valve shoulder 30 which seats against the valve seat 19 when the valve is fully inserted into the counterbore 18. The length of the valve neck portion 28 is preferably equal to the length of the body bore 14 between the inward limit of the inlet port 16 and the valve seat 19 and the longitudinal length of the larger diameter perimeter 26 of the valve preferably being less than one-half the length of the counterbore 18 for the purposes presently explained.

An O-ring 32 surrounds the valve neck 28 to insure sealing with the body bore 14. The valve 24 is further characterized by a plurality, four in the example shown, of circumferentially equally spaced longitudinally extending flow passageways 34 extending downstream between its shoulder 30 and its end surface opposite the inlet port.

The end portion of the counterbore 18, opposite the inlet port 16, threadedly receives a plug 36 having wrench flats 38 on its outwardly disposed end portion for inserting and removing the plug. The axial length of the plug 36 is substantially less than the length of the counterbore between the downstream end of the valve 30 and the plug end of the counterbore for the purposes presently apparent.

The inward marginal end surface of the plug abuts an annular resilient member such as an 0-ring 40 nested by a counterbored recess for the purpose presently explained.

The confronting end surfaces of the valve 24 and plug 36 are each centrally bored on converging diameters to form confronting cone-shaped recesses 42 and 44 respectively for the purposes presently explained. The apex or inward limit of each cone-shaped recess is further coaxially drilled to define sockets 46 and 48, respectively, which nests respective end portions of an elongated strut or pin 50 hereinafter referred to as "rupture pin". The rupture pin 50 may be a rod or tube or of other cross sectional configuration.

The plug 36 is similarly provided with a plurality, four in the example shown, of longitudinally extending circumferentially equally spaced flow passageways 52 for the purposes presently explained.

As an added feature, the body end shoulder 11 is drilled parallel with the valve body axis to form a plurality of sockets 54 having a depth substantially equal to the length of the pin 50 for receiving a like plurality or reserve supply of replacement rupture pins 50'. These pins 50' are installed prior to inserting the plug 36 so that its wrench flat head 38 prevents loss of the spare pins 50'.

Referring also to FIG. 2, another embodiment of the valve is indicated at 10' in which modified parts bear prime numerals and wherein the valve body 12' is formed in cross fashion defined by the additional opposing projections 56 and 58 which are centrally drilled and internally or externally threaded to form lateral valve ports 60 and 62. The lateral port 60 communicates with the inlet port 16' by an annular bore or passageway 64 formed or drilled in the valve body from the inlet port end. Similarly, the other lateral port 62 communicates with the inlet port by a companion bore or passageway 66 thus providing fluid communication between the lateral ports through the inlet port.

In use of the embodiment 10', the lateral port 60 is connected with a source of gas to be monitored as by the tube 22' while the other lateral port 62 is connected with a tube 68 utilizing the fluid or gas from the tube 22'. The inlet port 16' is plugged or connected with some other unit, such as the inlet 70 of a pressure gauge, not shown.

Operation

The operation of the pressure relief valve assembly 20 in both embodiments 10 and 10' is identical.

As is typical with my rupture pin pressure relief valve units, there are basically four variables: (1) the modulus of elasticity of the material in the pin; (2) the effective length of the pin; (3) the diameter of the pin or the radius of gyration of the centroid of the pin in the case that the pin, in transverse section, is in the shape of a tube or ovate; and, (4) the diameter of the piston on which the monitored pressure acts.

In the event the pressure in the cylinder or container, being monitored at the inlet port 16 or 16', exceeds a predetermined value, the piston 24 is moved toward the plug 36 and when its neck 28 leaves the body bore 14 the pressure acts on the valve full end surface including its shoulder 30 which insures a complete lateral bending or collapse of the rupture pin 50 and opening the gas at the inlet port to the atmosphere through the valve and plug passageways 34 and 52, respectively. The excess pressure against the valve 24 impacts its end surface, facing the plug, on the O-ring 40 which acts as a cushion to arrest the rapid piston valve movement toward the plug thus preventing damage to the valve.

To reset the valve 10 or 10', the plug 36 and the damaged pin 50 are manually removed. The valve 24 is reseated against the seat 19 and one of the replacement pins 50' is installed in place between the reinserted plug 36 and the valve.

Obviously the invention is susceptible to changes or alterations without defeating its practicability. Therefore, I do not wish to be confined to the preferred embodiment shown in the drawings and described herein.

I claim:
1. A pressure relief valve, comprising:
   a valve body having a through bore forming an inlet port at one end of the bore;
   valve means in the bore for opening and closing the inlet port;
   plug means in the other end portion of the bore; and,
   collapsible means including an elongated rigid member axially interposed between the valve means and the plug means for normally maintaining the inlet port closed.
2. The relief valve according to claim 1 in which the valve means includes:
   a valve axially slidable in the bore toward and away from said plug means.
3. The relief valve according to claim 2 in which said valve and said plug means are each provided with at least one through passageway parallel with the longitudinal axis of the body bore.
4. The relief valve according to claim 1 in which said valve body is provided with lateral ports and having internal passageways providing communication between the lateral ports through the inlet port.
5. A pressure relief valve, comprising:
   a valve body having a step diameter through bore forming an
   inlet port at a smaller end portion of the bore;
   piston valve means longitudinally slidable in the bore for opening and closing the inlet port;
   plug means in the other end portion of the bore; and,
   collapsible means including an elongated rigid member axially interposed between the valve means and the plug means for normally maintaining the inlet port closed.
6. The relief valve according to claim 5 in which the piston valve means includes:
   a step diameter piston axially slidable in the bore toward and away from said plug means.

7. The relief valve according to claim 6 and further including:
   impact cushion means interposed between said piston and said plug means.

8. The relief valve according to claim 6 in which said plug means and the larger end portion of said piston are each provided with at least one through venting passageway parallel with the longitudinal axis of the body bore.

9. The relief valve according to claim 5 in which said valve body is provided with opposing lateral ports and internal passageways providing communication between the lateral ports through the inlet port.

10. The relief valve according to claim 5 in which said valve body is characterized by at least one socket extending inwardly from its bore closing plug end for storing a second collapsible means.

* * * * *